United States Patent [19]

Bogosh

[11] Patent Number: 4,555,912

[45] Date of Patent: Dec. 3, 1985

[54] AIR HANDLING SYSTEM

[76] Inventor: Donald Bogosh, 437 Diana Ct., Bensenville, Ill. 60106

[21] Appl. No.: 506,289

[22] Filed: Jun. 21, 1983

[51] Int. Cl.⁴ ............................................. F25D 21/00
[52] U.S. Cl. ........................................ 62/272; 55/269; 62/55.5; 62/93
[58] Field of Search ..................... 62/93, 94, 271, 272, 62/55.5; 55/269

[56] References Cited

U.S. PATENT DOCUMENTS

| | | | |
|---|---|---|---|
| 3,585,808 | 6/1971 | Huffman | 62/93 |
| 3,596,474 | 8/1971 | Bloxham et al. | 62/93 |
| 4,193,443 | 3/1980 | Nanaumi et al. | 62/93 |
| 4,242,110 | 12/1980 | Hynes | 62/93 |
| 4,253,315 | 3/1981 | Fiedler | 62/93 |

Primary Examiner—Ronald C. Capossela
Attorney, Agent, or Firm—Robert E. Wagner; Ralph R. Rath

[57] ABSTRACT

An air-distributing system including a compressor for supplying compressed air to an outlet connected to a distributing conduit includes a condensing mechanism between the compressor and the distributing conduit for removing moisture from the compressed air. The condensing mechanism consists of an elongated chamber that has an inlet and an outlet adjacent the upper end with a tube extending from the inlet below the outlet and having a throttling valve at the lower end which produces expansion of the compressed air resulting in cooling within a condensing can where the cooling results in condensation on the surface of the condenser. The air flow is reversed by a funnel arrangement at the lower end of the condenser can and flows past the tube having the incoming, hotter compressed air to withdraw heat therefrom before entering into the distributing conduit.

18 Claims, 6 Drawing Figures

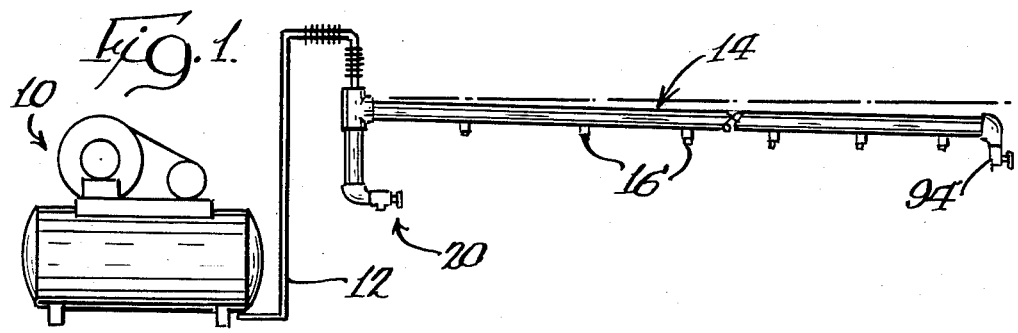
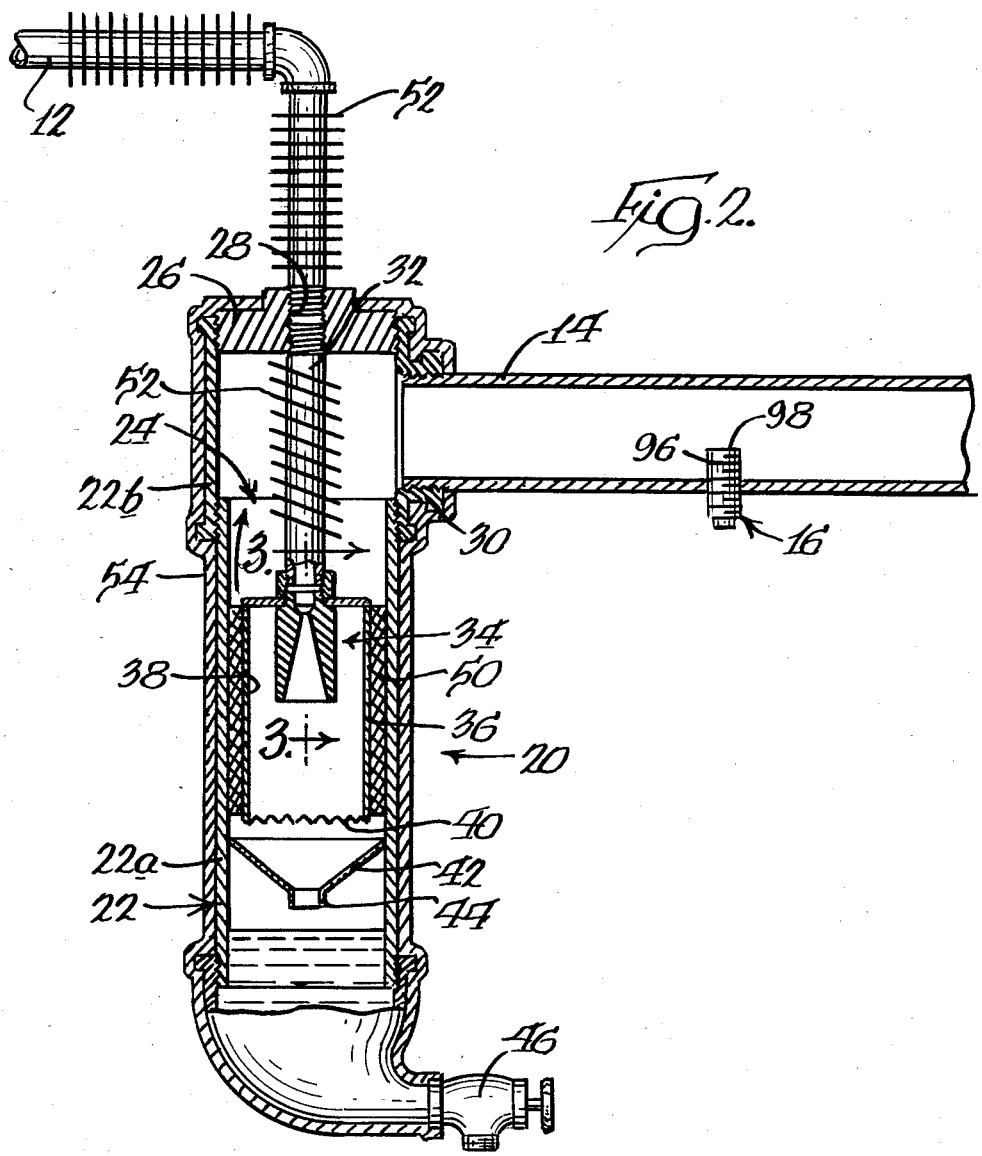

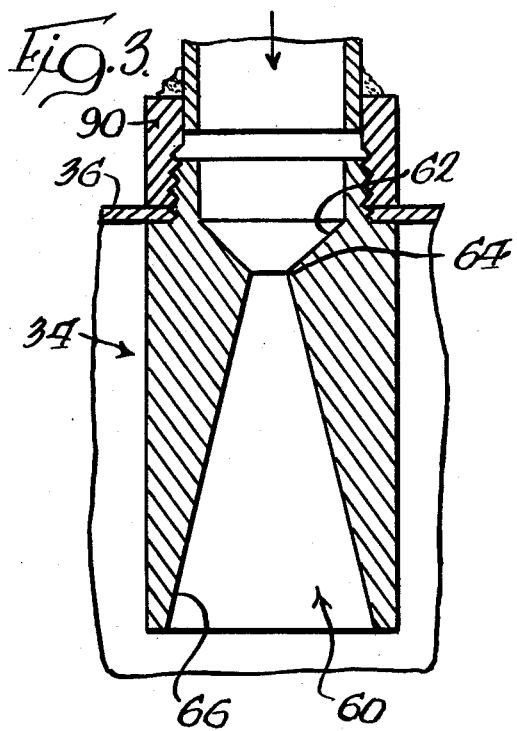
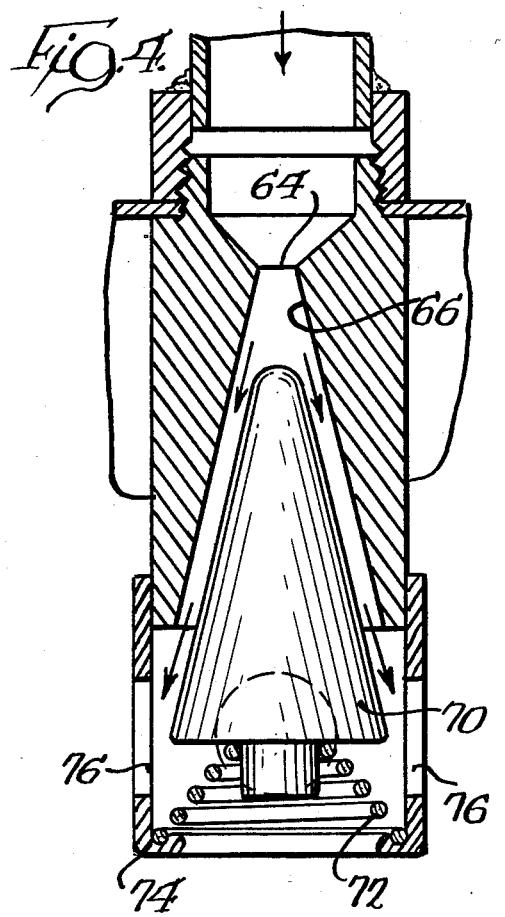
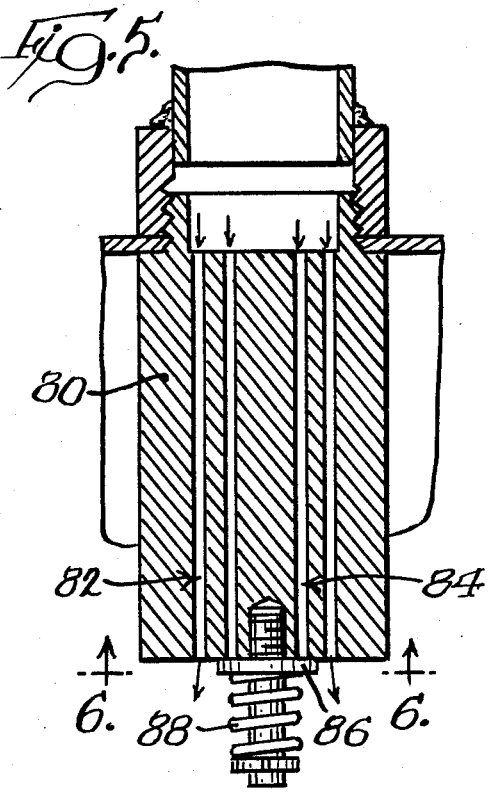
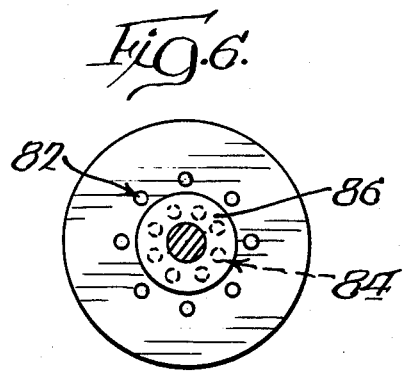

AIR HANDLING SYSTEM

DESCRIPTION

1. Technical Field

The present invention relates generally to compressed air systems and, more particularly, to an improved method and apparatus for removing moisture from compressed air.

2. Background Prior Art

The use of compressed air for operating tools in industrial plants or shops has been known for many, many years. With the increased use of compressed air for operating various tools, such as drill motors, spray guns, grinders and others, in a single shop, more recently systems have been developed where a single air compressor can be utilized for delivering compressed air to any number of tools. One such system consists of a compressor having a distribution conduit connected thereto with spaced outlets leading from the conduit so that several tools can be simultaneously connected to the compressor and operated from a single compressed air source.

One of the problems that has been inherent in air distribution systems is the moisture that is normally kept in suspension in the air supply. When this suspended moisture condenses, it turns into liquid and the liquid causes rust, contamination of oils and generally harms the operation of the air-consuming devices.

It is well known that if moist air is compressed and/or cooled, it loses some of its ability to keep moisture in suspension. The amount of condensation and the temperature at which condensation commences is a direct function of the level of moisture in the air and the pressure level of the air. It is this phenomenon that is utilized in the present invention to automatically remove moisture from pressurized air before it is delivered to the point of use.

SUMMARY OF THE INVENTION

According to the present invention, an air distribution system consists of a compressor having an outlet providing compressed air to a distributing conduit with a liquid condenser located between the compressor outlet and the distributing conduit inlet. The liquid condenser consists of an elongated chamber having an inlet connected to the compressor outlet and an outlet adjacent the inlet at the upper end of the chamber. A tube leads from the inlet and has a restricted orifice means at the lower end which discharges into a condensing can or container surrounded by a metal heat-transfer baffle.

The compressed air is throttled through the orifice means and expands in the condenser can, resulting in a temperature drop of the air which will cause the moisture to condense and collect on the surface of the condenser container. The cooled air then reverses and flows through the baffle for further cooling and condensation of the moisture. Preferably, the cooled air having the moisture removed therefrom then flows across or around the inlet tube as it passes to the outlet to withdraw heat from the incoming compressed air, thereby cooling the incoming compressed air.

In the preferred form of the invention, the liquid that condenses on the surface of the condensing can flows downwardly and into a funnel located adjacent the lower end of the chamber which acts as a condensate-air separator. The liquid flows into the bottom of the chamber, which has a drain that can be opened periodically to remove water therefrom. The heat transfer baffle surrounding the condensation can serves to increase the amount of surface area over which the expanded air flows and also serves to disperse and turbulate the slowed-down air flow so that further condensation can take place.

According to one aspect of the present invention, the orifice means is preferably in the form of a converging/diverging throttling valve which serves to expand the air flow in a very rapid, but controlled manner. Preferably, the throttling valve has a length that is about 9 to about 10 times the minimum orifice diameter of the throttling valve.

In a alternate embodiment, the throttling valve has a variable-sized orifice means that varies in response to variations in pressure of the compressed air.

In all embodiments of the invention, the compressed air enters the chamber at the upper end of the chamber and flows through a tube having an orifice or throttling valve at the lower end which results in expansion of the compressed air, thereby cooling the air to cause condensation of the moisture, which will collect on the surface of the condenser can. The flow of the cooled, compressed air is then reversed and flows through the heat transfer baffle and muffler which exposes the air to greater cooling surface area which enhances condensation of the moisture. The reverse flow also causes the cooled air to flow around the inlet tube, which causes heat transfer from the incoming compressed air to the now-cooled air, which is thus reheated but is in a drier condition.

BRIEF DESCRIPTION OF SEVERAL VIEWS OF DRAWINGS

FIG. 1 shows the air-handling system having the present invention incorporated therein;

FIG. 2 is an enlarged fragmentary cross-sectional view of the liquid condenser;

FIG. 3 is an enlarged cross-sectional view of the orifice means or the throttle valve;

FIG. 4 is a view similar to FIG. 3 showing a slightly modified form of throttling valve;

FIG. 5 is a cross-sectional view of a further modified form of throttling valve; and, FIG. 6 is an end view as viewed along lines 6—6 of FIG. 5.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 of the drawings shows an air-handling or distribution system 10 consisting of a compressor that compresses ambient air which flows through an outlet conduit 12 to a distributing conduit 14 that has a plurality of spaced outlets 16 for connection to various air-consuming devices that may be found in a plant or shop.

According to the present invention, a liquid condenser 20 is interposed between the distributing conduit 14 and the outlet conduit 12 of compressor 10. The liquid condenser or condensing mechanism 20 is constructed in accordance with the present invention to remove moisture from the compressed air passing through conduit 12 before it enters the distributing conduit 14. The details of the condensing mechanism 20 are illustrated in FIG. 2 of the drawings and consists of a tubular member 22 that defines an elongated chamber 24. The tubular member 22 is preferably formed in two parts, a lower part 22a and an upper part 22b, which is threaded on the upper end of the lower part 22a. The upper end of the upper part 22b has a plug 26 threaded therein which has an inlet opening 28. Upper portion 22a also has an outlet coupling member 30 for receiving the inlet end of distributing conduit 14.

The compressed air flowing through outlet conduit 12 is connected to inlet 28, which also has a tube 32 threaded therein with the tube having an orifice means 34 at the lower end thereof. The details of the orifice means will be described in more detail later, however, the orifice means or throttling valve 34 regulates the flow or expansion of the incoming compressed air in such a manner as to cause a temperature drop on the discharge side of the valve. This temperature drop of the air on the discharge side of the orifice means or valve 34 will cause moisture to condense and the condensation will collect on the inner surface of a condensing can or member 36 defining a inner condensing surface 38 so that the moisture is separated from the air and the temperature thereof is lowered. The primary function of condensing surface 38 is to provide a cool, slick surface area on which the moisture will condense. Preferably, this inner surface 38 is a highly polished surface, similar to chrome plating, so that the condensing moisture will "bead-up" rapidly reducing moisture surface area and eliminating any possibility of re-evaporation of the moisture. In order to insure that the beads of liquid will flow downwardly towards the bottom of the chamber 24, the lower edge of the condenser can is serrated as illustrated at 40 to provide a series of points or projections from which the liquid will drip.

Preferably, a funnel 42 having a small center opening 44 is located below the lower end of the condensing can 36. The funnel 42 may be considered to be a liquid-air separator and the small opening 44 at the lower end thereof reduces the exposure of the liquid to the air flow which may cause re-evaporation of the liquid. Again, the inner surface of the funnel 42 is preferably a highly-polished, slick surface to encourage "beading" of the liquid and reduces surface exposure. The liquid that condenses or flows through opening 44 is collected at the lower end of chamber 24, which has either a manual or automatic operating drain 46 so that the liquid can periodically be drained.

As indicated above, the funnel 42 acts as a separator for the air and liquid and also produces a reversal of flow of the air upwardly around the periphery of the condensing can in a space provided therebetween. Preferably, the space between the inner surface of chamber 24 and the outer surface of the condenser can 36 is filled with metallic woven or expanded metal 50 which increases the amount of surface area over which the air flows while it is flowing towards the outlet 30 which further reduces the temperature of the air and provides for further condensation which will collect in the bottom of the chamber 24. It should also be noted that the construction and arrangement of parts is such that the air must flow past the inlet tube 32 as it is flowing towards the exit. This arrangement provides for a further cooling of the incoming compressed air through tube 32 which, in essence, reheats the air which is now dry and enters into the distribution conduit 14. If desired, the entire tube may have spaced fins 52 to further increase the surface area for heat transfer of the compressed air in tube 32 to the drier, cooler air entering the distributing conduit 14. Also, depending upon the distance between the outlet of compressor 10 to the inlet of distributing conduit 14, fins 52 may also be provided around portions of conduit 12, depending upon various other parameters.

In certain instances, the temperature drop may be sufficient so as to produce condensation on the outer surface of the tubular member 22. While this does not affect the overall operation of the unit, such condensation can be eliminated by surrounding the entire mechanism with insulation, as illustrated at 54.

The orifice means 34 is the primary element of the overall combination which controls the amount of expansion of the incoming air which, in turn, controls the amount of moisture that is removed. While, it is possible that various types of throttling valves 34 may be used, preferably the throttling valve or orifice means 34 is of the type illustrated in FIG. 3. The throttling valve or orifice means 34 incorporates an opening 60 that has a converging portion 62 at its upper end leading to a minimum diameter portion 64 and a diverging portion 66.

The converging end provides a smoothed-radiused entry into circular opening 64 which minimizes any turbulent losses which could occur when the air flow is directed from a large diameter pipe to a small diameter opening hole. The diverging end of the opening serves to expand the air flow in a very rapid, but controlled manner. It has been determined that a tapering, diverging section 66 that has a taper of approximately 13° included angle and a length of about 9 to about 10 times the minimum diameter 64 produces an air flow which expands rapidly without any significant turbulence.

The minimum diameter of the orifice is a function of the amount of air which is required from the compressor. Conservatively, a pressure drop across the minimum diameter orifice should be in the range of about 10 to about 20 psi, which will vary with inlet pressures and required outlet pressures at the points of useage. Tabulation of values of air flow for various orifice diameters can be found in standard handbooks, and one such reference is the chart on Page 188 of *Introduction to Fluid Mechanics* by Russell W. Henke, 1966 edition. It should be noted as the downstream-pressure drops due to increased air useage, the pressure drop across the orifice increases until a situation occurs where the air in the orifice is at "sonic velocity", after which further increases in air useage will only produce further pressure drops on the downstream side of the orifice means or throttling valve. This situation should be avoided by selection of a larger orifice.

In certain instances, it may be desirable to have a variable orifice means or throttling valve which is dependent upon the pressure of the incoming compressed air to maintain a predetermined pressure drop across the orifice means. FIGS. 4 and 5 illustrate two different configurations of variable-sized orifice means that form the throttling valve. In the embodiment illustrated in FIG. 4 the orifice means 34 is similar in configuration to the orifice means described in FIG. 3. However, in this embodiment, a tapered element 70 having a taper equal to the outward tapering of the diverging portion 66 is biased into engagement with the diverging portion 66.

This may be accomplished by a spring 72 held within a cup 74 that is secured as by threading at its upper end to the outer surface of the orifice means. With suitable openings 76 in the cup 74, the flow of air is as indicated by the arrows in FIG. 4 and increased pressure will increase the spacing between the element 70 and the diverging orifice 66.

A further modified form of variable orifice means is illustrated in FIG. 5, wherein the orifice means or throttling valve consists of an elongated member 80 having two sets of smaller openings 82 and 84. The openings 84 on the smaller diameter have a closing element 86 aligned therewith and biased by a spring 88. Thus, under normal conditions, the air flow would be through only the outer openings 82, while the bias of the spring would close the inner openings. As the pressure of the compressed air at the inlet increases, the biasing force of spring 88 would be overcome so that air flow could also occur through the openings 84.

As illustrated in FIGS. 3, 4 and 5, the orifice means or throttling valve 34 can be retained on condenser can through a threaded coupling 90. Alternatively, the throttling valve 34 and condenser can 36 could be formed as a single unit.

In certain instances where the air has an extremely high humidity, which humidity varies with the ambient conditions, it may be possible that some of the moisture is not removed, which may subsequently condense within the distributing channel 14 as the compressed air is being utilized. For this purpose, it is desirable that the distributing conduit be tapered from the inlet end to the opposite end by a small degree, as illustrated in FIG. 1 of the drawings, so that any moisture that condenses within the distributing conduit will flow to the opposite end where it can be periodically drained by opening a drain 94.

According to a further aspect of the invention, the connections 16 are preferably in the form of threaded members 96 that are threaded into openings in distributing conduit 14 and have their upper ends 98 located above the lowest surface of the distributing conduit. Thus, any condensation or collection of droplets of liquid within the distributing conduit will not have a tendency to flow into the tooling during use.

As can be appreciated from the above description, the present invention provides a novel method and apapratus for removing moisture from compressed air utilizing only static components that have considerable life and are easy to manufacture, as well as easy to install. Of course, various other orificing arrangements could be substituted to produce the desired expansion effect, resulting in the cooling of the compressed air. Also, in some instances it may be desirable to fabricate the condenser can 36 and throttling valve 34 as a single unit from any number of materials, such as plastics, aluminum or copper. For example, in situations where air useage is sporadic or intermittent, it would be preferable to utilize a metal such as aluminum or copper, which has rapid heat transfer capability.

I claim:

1. An air distribution system comprising a compressor having an outlet for providing compressed air to a distributing conduit, the improvement of a liquid condenser between said outlet and said conduit and comprising an elongated chamber, a tube connected to said outlet and extending into said elongated chamber, expansion orifice means arranged in said chamber and carried on a free end of said tube, means defining a condensing surface arranged around an outlet of said expansion orifice means so that compressed air received from said compressor will flow through said tube and expand while passing through said expansion orifice causing suspended liquid to collect on said condensing surface and be separated from said compressed air before entering said distributing conduit.

2. An air distribution system as defined in claim 1, in which said elongated chamber extends vertically and has an outlet adjacent an upper end connected to said distributing conduit and said condensing surface terminates above a lower end of said elongated chamber so that condensed liquid collected on said surface moves along said condensing surface and collects in said lower end of said elongated chamber.

3. An air distribution system as defined in claim 2, further including drain means on said lower end of said elongated chamber for removing liquid collected in said chamber.

4. An air distribution system as defined in claim 3, further including funnel means between said condensing surface and said lower end of said chamber for directing liquid drops from said condensing surface to said lower end.

5. An air distribution system as defined in claim 1, in which said tube has spaced radially extending fins for transfer of heat from the compressed air in the tube.

6. An air distribution system as defined in claim 1, in which said distributing conduit slopes downwardly from said outlet to an opposite end with liquid collection means at said opposite end.

7. An air distribution system as defined in claim 6, in which said distributing conduit has spaced connectors with each connector including a threaded member extending through a lower portion of said conduit and having inner open end spaced above an inner surface of said lower portion.

8. An air distribution system as defined in claim 1, further including means in said restricted orifice means for varying the orifice size in response to pressure of said compressed air.

9. An air distribution system as defined in claim 8, in which said last means includes a plurality of openings.

10. A condensing mechanism for removing suspended moisture from compressed air comprising means defining an elongated chamber having an inlet at an upper end and an outlet adjacent said upper end, a tube extending from said inlet across said outlet and terminating above a lower end of said chamber, expansion orifice means carried on the lower end of said tube, a condensing can extending from said expansion orifice means toward said lower end and having a lower open end spaced above said lower end of said chamber so that moisture-laden compressed air will flow through said tube and expand while flowing through said expansion orifice means causing a reduction in temperature of said compressed air to condense moisture into liquid droplets that collect on the condenser can and flow into the lower end of said chamber while the compressed air flows around said condenser can and tube to said outlet to provide a cooling effect on the incoming compressed air flowing through said tube.

11. A condensing mechanism as in claim 10, further including a funnel between said condenser and said lower end of said chamber acting as a separator of air and liquid droplets.

12. A condensing mechanism as in claim 11, further including drain means on said lower end of said chamber periodically operable to drain liquid from said chamber.

13. A condensing mechanism as in claim 10, in which said restricted orifice means includes an opening which has a diverging outlet end having a length many times greater than a minimum diameter thereof.

14. A condensing mechanism as in claim 13, in which said length of the outlet end is on the order of about nine to about ten times the minimum diameter.

15. A condensing mechanism as in claim 10, in which said restricted orifice means includes a member having a plurality of openings.

16. A condensing mechanism as in claim 15, in which said member incorporates means for opening and closing at least some of said openings.

17. A condensing mechanism as in claim 10, in which said restricted orifice means includes a member having a single opening therethrough with said opening having an outwardly-flared lower end and an element having a configuration generally corresponding to outwardly-flared lower end and being movable in response to pressure of compressed air to vary the size of said orifice means.

18. A condensing mechanism as defined in claim 10, further including a heat transfer baffle surrounding said condenser can in said chamber.

* * * * *